Sept. 3, 1929.  F. A. KOLSTER  1,726,705
RADIO APPARATUS
Filed Dec. 13, 1922
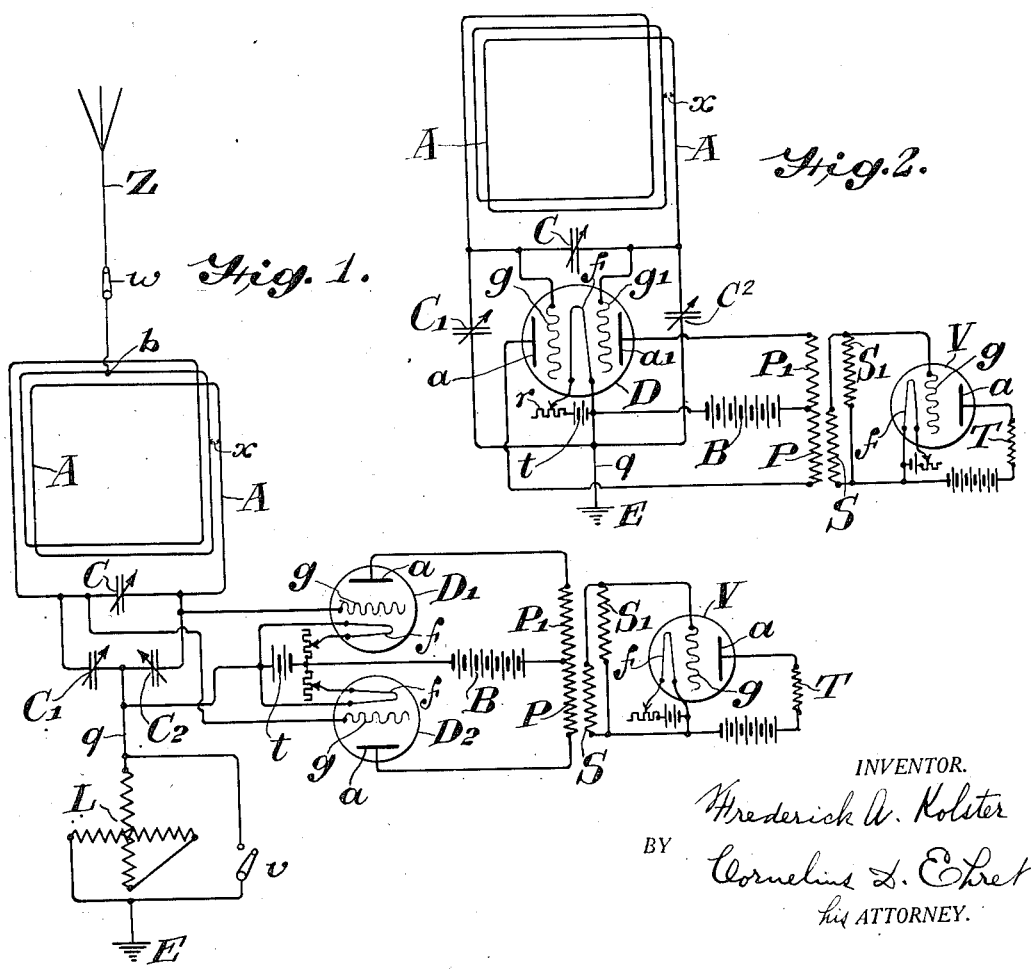

Patented Sept. 3, 1929.

1,726,705

UNITED STATES PATENT OFFICE.

FREDERICK A. KOLSTER, OF SAN JOSE, CALIFORNIA, ASSIGNOR TO FEDERAL TELEGRAPH COMPANY, OF SAN FRANCISCO, CALIFORNIA, A CORPORATION OF CALIFORNIA.

RADIO APPARATUS.

Application filed December 13, 1922. Serial No. 606,587.

My invention relates to radio receiving apparatus utilizable for receiving telegraphic, telephonic, or other signals or messages from a particular station to the exclusion or reduction of effects from other stations, and as a radio compass, direction finder, interference preventer, etc.

In accordance with my invention, a rotatable coil structure, having small or no distributed inductance and small or no distributed capacity, is utilized for absorbing electro-radiant energy directly from the natural media with directive or directional characteristic, and is, for some purposes, associated with an open or antenna absorption path in such manner that not only the general direction, but the true sense of direction of a distant source of radiant energy may be determined.

Further in accordance with my invention, for finding with great nicety the true bearing of a distant source of radiant energy or for receiving signals or messages with great degree of exclusion of effects from undesired sources, the rotatble absorption coil structure is utilized in suitable circuit arrangement with a double audion or like thermionic detecting or amplifying apparatus whose cathode structure and the storage battery or other source for supplying current to the cathode structure are connected to earth or equivalent counterpoise capacity to eliminate the undesired effects of the capacity with respect to earth or counterpoise capacity of such storage battery or equivalent source; the employment of a double audion or of two audions aids materially in effecting the desired electrical symmetry or balance.

Further in accordance with my invention, the aforesaid connection to earth or counterpoise capacity may be utilized also as an antenna or open path for determining not only bearing, but true sense of direction of a distant source of radiant energy, such open or antenna path being preferably provided with tuning means, and with means for rendering such tuning means inoperative when the antenna or open path effects are not desired, as when finding true bearing only.

My invention resides in apparatus of the character hereinafter described and claimed.

For an illustration of some of the various forms my invention may take, reference is to be had to the accompanying drawings, in which:

Fig. 1 is a diagrammatic view of apparatus embodying my invention and comprising means for attaining high degree of refinement in determining bearings of distant radio sources.

Fig. 2 is a diagrammatic view of apparatus embodying my invention and comprising apparatus of the general character illustrated in Fig. 1, and having in addition means for tuning and rendering ineffective the antenna or open path.

Referring to Fig. 1, A is a coil of one or more turns constituting a lumped inductance connected in series with the variable tuning condenser C. The distributed inductance and distributed capacity of this closed circuit are preferably substantially nil. The closed circuit, and particularly the coil A thereof, constitutes a capacity area operating as a capacity or structure whose distributed capacity and distributed inductance are preferably small or substantially nil.

To ensure that the coil A shall have, as a coil, minimum distributed capacity and yet, as a capacity area, a maximum or large capacity with respect to earth or other capacity E, the coil may have its neighboring convolutions or turns separated from each other by a suitable or considerable space $x$, whereby the distributed capacity effect due to capacity between neighboring turns or convolutions is reduced to a negligible amount or is substantially nil.

The rotatable coil A, preferably having small or no distributed capacity and small or no distributed inductance, and preferably having its turns spaced as above described, forms with the adjustable tuning condenser C a closed circuit having small or no distributed capacity and small or no distributed inductance. Connected in series with each other and in parallel to the condenser C are balancing reactances, preferably capacitive reactances, as condensers $C^1$, $C^2$, both adjustable, and preferably adjustable in opposite senses, that is, as the capacity of $C^1$ increases the capacity of $C^2$ decreases. For this purpose the movable elements in the two condensers $C^1$, $C^2$ may be mechanically connected and operated in unison for the purpose of varying one condenser in opposite sense and in proper complementary relation to the other, the relative adjustments of the condensers serving to determine the degree of symmetry of the closed circuit with respect to the connection $q$ to earth or other counterpoise capacity E, such connection $q$ being made to a point between the reactances or condensers $C^1$, $C^2$. By suitably adjusting the condensers $C^1$, $C^2$ with respect to each other, or either of them alone with respect to the other, the closed circuit A, C may be made symmetrical with respect to the connection $q$, or unsymmetrical with respect thereto. While these condensers $C^1$, $C^2$ are preferably employed, from one aspect of my invention the condensers $C^1$, $C^2$ and their connections to the condenser C and to the connection $q$ may be omitted, leaving, however, the connection $q$ to the filament or cathode $f$ of the double audion or thermionic detector or amplifying device D having the grids $g$ and $g^1$ connected to opposite sides of the condenser C, and the anodes or plates $a$ and $a^1$ connected through the transformer primaries P and $P^1$ and the battery B with the cathode $f$, which latter is supplied by current from a storage or other battery $t$, whose one terminal is also connected to earth or counter-capacity E by the connection $q$. In circuit with the battery $t$ and the filament $f$ is a suitable adjustable resistance or rheostat $r$. Inductively related, respectively, to the primaries P, $P^1$ are the secondaries S and $S^1$, connected in parallel with each other, and having their terminals connected, respectively, to the grid $g$ and filament or cathode $f$ of a thermionic amplifying tube V, in whose anode or plate circuit is the winding T, which may be that of a signal-translating instrument, as a telephone, or may be the primary of a transformer communicating with one or more further stages of amplifying apparatus.

By connecting the battery $t$ and cathode $f$ to earth or counterpoise capacity E by the connection $q$, the effects of the capacity with respect to earth or counterpoise E of the storage battery or other source $t$ is eliminated. And when the condensers $C^1$ and $C^2$ are employed, as indicated, the capacity to earth of the battery or source $t$ does not in any way affect the symmetry or degree of dissymmetry of the closed circuit A, C with respect to the connection $q$.

While the condenser C is utilized mainly or solely for tuning the closed circuit A, C, the total capacity in such circuit is that of the condenser C plus the parallel capacity comprising the capacities $C^1$ and $C^2$ in series with each other. But if these capacities $C^1$ and $C^2$ are adjusted complementarily, their total effect as a capacity in parallel to the capacity C remains substantially constant.

Inasmuch as the grids $g$ and $g^1$ are connected to opposite sides of the tuning condenser C, at any instant they assume opposite polarities, and therefore the currents in the corresponding anode circuits change in opposite senses. But the transformer structure P, $P^1$, S, $S^1$ is differential, and when the grids $g$ and $g^1$ are thus affected in opposite senses by the current in the closed circuit A, C, there is a cumulative effect upon the grid $g$ of the amplifier V by the secondaries S, $S^1$. As regards any effects by the current in an open or antenna path comprising the connection $q$, earth or counterpoise capacity E, and the capacity of the coil A as a capacity area, when the condensers $C^1$, $C^2$ have such relative values that the closed circuit A, C is strictly symmetrical with respect to the connection $q$, the grids $g$ and $g^1$ simultaneously partake of like polarities or potential changes, and there is no effect upon the grid $g$ of the amplifying tube V, because of the differential effects of the transformer coils P, $P^1$, S, $S^1$. In other words, the arrangement is such that there is no effect due to the so-called open or antenna path, and the true bearing of a distant source of electroradiant energy may be determined with great nicety and refinement, because of elimination of effect of capacity with respect to earth or counterpoise E of storage battery or other source $t$.

While the double audion or thermionic detecting apparatus D is shown as having the electrodes all within one evacuated bulb, it will now be understood, and particularly as indicated in connection with Fig. 2, that two separate thermionic bulbs may be employed, each having its own anode, cathode and grid.

Referring to Fig. 2, there are employed two separate thermionic detectors or amplifiers $D^1$ and $D^2$, each having a cathode or filament $f$, a grid $g$, and an anode or plate $a$. Here again one terminal of the filaments $f$ and of the storage battery or other source $t$ are connected to the earth or counterpoise connection $q$. The grid $g$ of the vacuum tube amplifier V is affected cumulatively by the differential transformers when the closed circuit A, C is symmetrical with respect to the antenna or open path including the connection $q$, and is not affected by any current in the open or antenna path when the closed circuit A, C is symmetrical with respect to such antenna path or open circuit.

In Fig. 2 there is included in the open or antenna path the variable inductance, as a variometer, L, which may be short circuited by closing the switch $v$. Additional antenna capacity area may be supplied or utilized in the open or antenna path when the switch $w$ is closed, thereby connecting the capacity area or antenna structure Z to a mid-point, as $b$, of the coil A.

While the arrangement of Fig. 1 above described is utilized principally for finding with great nicety the true bearing of a distant source of electro-radiant energy, by utilizing the arrangement of Fig. 2 the true sense of direction of such source of electro-radiant energy may be determined by first rendering the open or antenna path inoperative upon the receiving apparatus, as by closing the switch $v$, and by first determining the bearing of the distant source by rotating the coil A to such position that there is silence or no response in the receiving telephone T. This position of silence or no response is decidedly critical, and is made so by utilization of the double audion arrangement of either Figs. 1 or 2, and the elimination of the effects of the capacity to earth or counterpoise E of the filament battery $t$. When such critical position for silence has been determined, it is known that the plane of the coil A, which is preferably axially short, is normal to the line of direction to the distant source of electro-radiant energy. Then by opening the switch $v$ and adjusting the inductance or variometer L to tune the open or antenna path to the frequency of the energy radiated by such distant source, and rendering the closed circuit A, C unsymmetrical with respect to the open or antenna path by suitably adjusting the condensers $C^1$, $C^2$, the potentials of the grids $g$ of the devices $D^1$ and $D^2$ are affected in opposite senses by the current in the closed circuit due to energy absorbed by such closed circuit directly from the natural media, and due in addition to energy transferred to the closed circuit due to the dissymmetry of the closed circuit with respect to the open or antenna path. As to the effects in the open or antenna path alone when it is thus unsymmetrical with respect to the closed circuit, the grids $g$, $g$ of the two detectors $D^1$ and $D^2$ are not at the same potentials at the same instants. But this effect is slight, and may be neglected. It is the effect of the closed circuit upon the grids of these detectors $D^1$, $D^2$ that is important, due to the energy directly absorbed from the natural media by the coil A, and the energy transferred to the closed circuit A, C due to the dissymmetry of such closed circuit with respect to the open or antenna path.

The effect of the open or antenna path may be made practically zero either by closing the switch $v$, or by adjusting the inductance L to such value that the open or antenna path is not tuned to the frequency of the energy to be absorbed by the coil A. In either case, however, by tuning the open or antenna path as aforesaid and moving the coil A to or towards the position in which the plane of the coil A points to the distant source of electro-radiant energy, the true sense of that source may be determined by noting the sense of change in the loudness of signal in the telephone T with the sense of movement of the coil A.

In both modifications of my invention, when the condenser C and $C^2$ are adjusted to symmetry, the conductor $q$ from ground is connected therebetween to an electrical center point in the system such that as to the open antenna path, there is no difference of potential between the terminals of loop A or tuning condenser C. Symmetry between the open antenna path and closed circuit minimizes or eliminates the open antenna effect, which is desirable when determining sense of direction but undesirable when line of bearing is determined by loop A.

When the closed circuit is utilized for determining bearing only, and the open antenna effect is not utilized, the cathode or cathodes of the thermionic device or devices is or are connected to earth, ground or equivalent capacity through a non-reactive path.

As regards Figs. 1 and 2, it will be understood that the source of energy or battery for the filament $f$ of the amplifier V, or of any successive amplifiers, may be the same battery $t$ used for the double audion D, Fig. 1, or the two audions $D^1$, $D^2$, Fig. 2.

What I claim is:

1. The combination with a path traversed by current representing energy absorbed from the natural media, of a pair of thermionic devices comprising cathode structure, anodes and control electrodes, a connection to earth or counter-capacity from said cathode structure to render the symmetry or dissymmetry of said path independent thereof, means for subjecting said control electrodes to points in said path such as to cause the potentials of said control electrodes to change in opposite senses by current in said path, a signal-translating instrument, and means controlled by the anode circuits of said thermionic devices for affecting said signal-translating instrument cumulatively.

2. The combination with a path traversed by current representing energy absorbed from the natural media, of a pair of thermionic devices comprising cathode structure, anodes and control electrodes, a connection to earth or counter-capacity from said cathode structure, means for subjecting said control electrodes to potentials at different points in said path, a pair of reactances connected in series with each other to different points in said path, a connection to earth or counter-capacity from a point between said reactances, a signal-translating instrument, and means for subjecting said instrument to the joint effect of currents in the anode circuits of said thermionic devices.

3. The combination with a path traversed by current representing energy absorbed from the natural media, of a reactance in said path, a pair of thermionic devices comprising cathode structure, anodes and control electrodes, connections from said control electrodes to opposite sides of said reactance, a pair of reactances connected in series with each other to points on opposite sides of said reactance, a connection to earth or counter-capacity from a point between the reactances of said pair, a connection to earth or counter-capacity from said cathode structure, a signal-translating instrument, and means for subjecting said instrument to the joint effect of the currents in the anode circuits of said thermionic devices.

4. The combination with an inductance absorbing energy directly from the natural media, of a capacity connected in circuit with said inductance, a pair of reactances connected in series with each other to opposite sides of said capacity, a pair of thermionic devices having cathode structure, anodes and control electrodes, connections from said control electrodes to opposite sides of said capacity, a connection to earth or counter-capacity from a point between said reactances, a connection to earth or counter-capacity from said cathode structure, a signal-translating instrument, and means for subjecting said instrument to the joint effect of the currents in the anode circuits of said thermionic devices.

5. The combination with a closed circuit including absorption structure having non-uniform directional characteristic, of a pair of thermionic devices comprising cathode structure, anodes and control electrodes, means supplying current for heating said cathode structure, a connection to earth or counter-capacity from said means to render the symmetry or dissymmetry between said circuit and said absorption structure independent thereof, connections from said control electrodes to different points in said closed circuit, whereby the potentials of said electrodes are changed in opposite senses by current in said closed circuit, a signal-translating instrument, and means controlled by the anode circuits for affecting said signal-translating instrument cumulatively.

6. The combination with a closed circuit including absorption structure having non-uniform directional characteristic, of a pair of thermionic devices comprising cathode structure, anodes and control electrodes, means supplying current for heating said cathode structure, a connection from said cathode structure to earth or counter-capacity to render the symmetry or dissymmetry between said circuit and said absorption structure independent thereof, connections from said control electrodes to different points in said closed circuit, whereby the potentials of said electrodes are changed in opposite senses by current in said closed circuit, a signal-translating instrument, and means controlled by the anode circuits for affecting said signal-translating instrument cumulatively.

7. The combination with a closed circuit including absorption structure having non-uniform directional characteristic, of a pair of thermionic devices comprising cathode structure, anodes and control electrodes, means supplying current for heating said cathode structure, a connection to earth or counter-capacity from said means, connections from said control electrodes to different points in said closed circuit, whereby the potentials of said electrodes are changed in opposite senses by current in said closed circuit, a signal-translating instrument, means controlled by the anode circuits for affecting said signal-translating instrument cumulatively, and reactances adjustable to vary between symmetry and dissymmetry the relation of said closed circuit to said connection to earth or counter-capacity.

8. The combination with a closed circuit including absorption structure having non-uniform directional characteristic, of a pair of thermionic devices comprising cathode structure, anodes and control electrodes, means supplying current for heating said cathode structure, a connection from said cathode structure to earth or counter-capacity, connections from said control electrodes to different points in said closed circuit, whereby the potentials of said electrodes are changed in opposite senses by current in said closed circuit, a signal-translating instrument, means controlled by the anode circuits for affecting said signal-translating instrument cumulatively, and reactances adjustable to vary between symmetry and dissymmetry the relation of said closed circuit to said connection to earth or counter-capacity.

9. The combination with a closed circuit including absorption structure having non-uniform directional characteristic, of a pair of thermionic devices comprising cathode structure, anodes and control electrodes, means supplying current for heating said cathode structure, a connection from said means to earth or counter-capacity, connections from said control electrodes to different points in said closed circuit, whereby the potentials of said electrodes are changed in opposite senses by current in said closed circuit, a signal-translating instrument, means controlled by the anode circuits for affecting said signal-translating instrument cumulatively, and variable reactances for adjusting to symmetry the relation of said closed circuit to said connection to earth or counter-capacity.

10. The combination with a closed circuit including a rotatable coil absorbing high frequency energy directly from the natural media and a tuning condenser, of a pair of thermionic devices comprising cathode structure, anodes and control electrodes, means supplying current for heating said cathode structure, a connection from said cathode structure to earth or counter-capacity, connections from said control electrodes to opposite sides of said condenser, a signal-translating instrument, and means controlled by said anode circuits for affecting said signal-translating means cumulatively.

11. The combination with a closed circuit including a rotatable coil absorbing high frequency energy directly from the natural media and a tuning condenser, of a pair of thermionic devices comprising cathode structure, anodes and control electrodes, means supplying current for heating said cathode structure, a connection to earth or countercapacity from said means, connections from said control electrodes to opposite sides of said condenser, a signal-translating instrument, and means controlled by said anode circuits for affecting said signal-translating means cumulatively.

12. The combination with a rotatable coil absorbing high frequency energy directly from the natural media and having a directional characteristic, and a circuit for said coil, of a pair of thermionic devices comprising cathode structure, anodes and control electrodes, means supplying current for heating said cathode structure, a connection to earth or counter-capacity from said means, means for impressing upon said control electrodes potentials corresponding with different potentials at different points in said circuit, a signal-translating instrument controlled by the anode circuits of said thermionic devices, an open path associated with the circuit of said rotatable coil, and reactances adjustable to determine the degree of symmetry between said open path and the circuit of said rotatable coil.

13. The combination with a rotatable coil absorbing high frequency energy directly from the natural media and having a directional characteristic, and a circuit for said coil, of a pair of thermionic devices comprising cathode structure, anodes and control electrodes, a connection to earth or counter-capacity from said cathode structure, means for impressing upon said control electrodes potentials corresponding with different potentials at different points in said circuit, a signal-translating instrument controlled by the anode circuits of said thermionic devices, an open path associated with the circuit of said rotatable coil, and reactances adjustable to determine the degree of symmetry between said open path and the circuit of said rotatable coil.

14. The combination with an inductance absorbing energy directly from the natural media, of a pair of thermionic devices having cathode structure, anodes and control electrodes, connections from said control electrodes to terminals of said inductance, a connection to earth or counter-capacity from said cathode structure, a pair of reactances each connected between said cathode structure and a respective end of said inductance, a signal translating instrument, and means for subjecting said instrument to the joint effect of currents in the anode circuits of said thermionic devices.

15. The combination with an inductance absorbing energy directly from the natural media, of paths from terminals of said coil to earth or countercapacity, each including a reactance, a pair of thermionic devices, each having its input electrodes connected to terminals of a reactance, a signal translating instrument, and means for subjecting said instrument to the joint effect of currents in the anode circuits of said thermionic devices.

16. The combination with an inductance absorbing energy directly from the natural media, of paths from terminals of said coil to earth or countercapacity, each including a reactance, a pair of thermionic devices, each having its input electrodes connected to terminals of a reactance, means to effect complementary adjustment of said reactances, a signal translating instrument, and means for subjecting said instrument to the joint effect of currents in the anode circuits of said thermionic devices.

17. In a directional radio system, the combination with a rotatable direction-finding coil effecting interchange of radiant energy with a natural medium, of a condenser operatively associated with the terminals of said coil to comprise a closed tuned circuit, a thermionic device having an anode, cathode and control electrode, means for operatively connecting one of the input electrodes of said device to a terminal of said coil, and means effecting connection of another of the input electrodes of said device to earth or equivalent capacity through a non-reactive path.

18. In a directional radio system, the combination with a rotatable direction-finding coil effecting interchange of radiant energy with a natural medium, of a condenser operatively associated with the terminals of said coil to comprise a closed tuned circuit, a thermionic device having an anode, cathode and control electrode, means operatively connecting said control electrode to a terminal of said coil, a connection from said cathode to earth or equivalent capacity through a non-reactive path, and a connection from earth or equivalent capacity to an electrical center point of the coil.

19. In a directional radio receiving system, the combination with a rotatable inductance coil for absorbing radiant energy, of a condenser connected across the terminals of said coil to comprise therewith a closed tuned circuit, a thermionic device having an anode, cathode and control electrode, means for connecting one of the input electrodes of said device to a terminal of said coil, and means for connecting another input electrode of said device to a point of said closed circuit between which and the terminals of said coil there exists equal magnitudes of potential due to absorbed radiant energy and to earth or equivalent capacity through a non-reactive path.

20. In a directional radio system, the combination with a closed circuit including a rotatable bearing coil for absorbing radiant energy, of a thermionic device whose cathode and control electrode are operatively related, respectively, to points in said closed circuit between which there exists a difference of potential produced by said absorbed radiant energy corresponding to the difference of potential across substantially one-half of said bearing coil, and a connection from said cathode to earth or equivalent capacity area.

21. In a directional radio system, the combination with a closed circuit including a rotatable bearing coil for absorbing radiant energy and a variable tuning capacity, of a thermionic device whose cathode and control electrode are operatively related, respectively, to points in said closed circuit between which there exists a difference of potential corresponding to the difference of potential across substantially one-half of said bearing coil, and a connection from said cathode to earth or equivalent capacity area.

22. In a directional radio system, the combination with a closed circuit including a rotatable bearing coil and a variable tuning capacity comprising therewith a closed circuit, a path comprising a connection from ground or equivalent capacity area to a point in said system effecting substantially zero potential difference, as to currents in said path, between terminals of the bearing coil or tuning capacity, a thermionic device whose control electrode and cathode are operatively related to said point and to a terminal of said bearing coil, and a non-reactive connection from said cathode to ground or equivalent capacity area.

23. In a directional radio system, the combination with a closed circuit including a rotatable bearing coil and a variable tuning capacity comprising therewith a closed circuit, a path comprising a connection from ground or equivalent capacity area to a point in said system effecting substantially zero potential difference, as to currents in said path, between terminals of the bearing coil or tuning capacity, a thermionic device whose control electrode and cathode are operatively related respectively to said point and to a terminal of said bearing coil, and a non-reactive connection from said cathode to ground or equivalent capacity area.

24. In a directional radio system, the combination with a closed circuit including a rotatable coil in direct energy interchange relation with a natural medium, of an open antenna path to earth or equivalent capacity, means for determining symmetry of said closed circuit with respect to said path, a thermionic device having an anode, cathode and control electrode, means for operatively relating said control electrode and cathode to a terminal of said coil and a substantially electrical midpoint of said coil, respectively, and a connection from said cathode to ground or equivalent capacity.

25. In a directional radio system, the combination with a closed circuit including a rotatable coil in direct energy interchange relation with a natural medium, of thermionic devices having anodes, control electrodes and cathode structure, means for operatively relating the control electrodes to points between which there exists a difference of potential substantially equal to the difference of potential across said coil, means for operatively relating said cathode structure to a point whose potential is substantially midway between the potentials of the aforesaid points, and means for connecting the cathode structure to earth or equivalent capacity through a non-reactive path.

In testimony whereof I have hereunto affixed my signature this 28th day of November, 1922.

FREDERICK A. KOLSTER.